(12) United States Patent
Hirota et al.

(10) Patent No.: US 9,464,824 B2
(45) Date of Patent: Oct. 11, 2016

(54) HEAT EXCHANGE REACTOR AND ADSORPTION HEAT PUMP

(71) Applicant: KABUSHIKI KAISHA TOYOTA CHUO KENKYUSHO, Nagakute-shi, Aichi-ken (JP)

(72) Inventors: Yasuki Hirota, Seto (JP); Takafumi Yamauchi, Seto (JP); Takashi Shimazu, Nagoya (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 247 days.

(21) Appl. No.: 14/218,406

(22) Filed: Mar. 18, 2014

(65) Prior Publication Data

US 2014/0283544 A1  Sep. 25, 2014

(30) Foreign Application Priority Data

Mar. 19, 2013  (JP) ................................. 2013-057262

(51) Int. Cl.
*F25B 17/08* (2006.01)
*F25B 37/00* (2006.01)

(52) U.S. Cl.
CPC ............... *F25B 17/08* (2013.01); *F25B 37/00* (2013.01); *Y02B 30/64* (2013.01)

(58) Field of Classification Search
CPC ......... F25B 17/08; F25B 37/00; Y02B 30/64
USPC .................. 165/104.12, 133, 185; 29/890.03
See application file for complete search history.

(56) References Cited

U.S. PATENT DOCUMENTS

| 4,309,980 A | * | 1/1982 | McCormack | ............ | C09K 5/16 |
| | | | | | 126/263.05 |
| 4,393,924 A | * | 7/1983 | Asami | ................... | F28D 20/003 |
| | | | | | 165/104.12 |

(Continued)

FOREIGN PATENT DOCUMENTS

| JP | H04-143558 A | 5/1992 |
| JP | 2000-241041 A | 9/2000 |

(Continued)

OTHER PUBLICATIONS

Feb. 24, 2015 Office Action issued in Japanese Application No. 2013-057262.

(Continued)

*Primary Examiner* — Tho V Duong
*Assistant Examiner* — Raheena Rehman
(74) *Attorney, Agent, or Firm* — Oliff PLC

(57) ABSTRACT

A heat exchange reactor includes: a first flow path through which a heat exchange fluid flows; a second flow path through which a working fluid flows; and an adsorbent shaped body that is disposed in the second flow path, the adsorbent shaped body having a heat transfer face at which heat is exchanged with the heat exchange fluid flowing in the first flow path, and plural recessed portions arrayed in two dimensions at predetermined spacings along a direction in which the working fluid flows such that the working fluid flows into the plurality of recessed portions, the adsorbent shaped body including an adsorbent and a fibrous thermally conductive material, the adsorbent releasing heat when the working fluid is adsorbed and accumulating heat when the working fluid is desorbed, and the fibrous thermally conductive material being disposed such that an axial direction thereof is oriented in a direction that intersects with the heat transfer face.

16 Claims, 12 Drawing Sheets

(56) References Cited

U.S. PATENT DOCUMENTS

| | | | | |
|---|---|---|---|---|
| 5,186,241 | A * | 2/1993 | Kunugi | F25B 17/00 165/104.12 |
| 5,347,830 | A * | 9/1994 | Yamada | B60H 1/3201 165/104.12 |
| 5,526,648 | A * | 6/1996 | Wertenbach | B60H 1/00392 165/104.12 |
| 6,257,322 | B1 * | 7/2001 | Toh | F28D 7/1692 165/104.11 |
| 6,360,811 | B1 * | 3/2002 | Toh | C01B 3/001 165/10 |
| 2002/0006365 | A1 * | 1/2002 | Suzuki | B01D 53/0407 422/177 |
| 2009/0025555 | A1 * | 1/2009 | Lively | B01D 53/0438 95/114 |
| 2009/0217526 | A1 * | 9/2009 | Mittelbach | B01J 20/103 29/890.03 |
| 2009/0217691 | A1 * | 9/2009 | Schmidt | F25B 35/04 62/271 |
| 2010/0252248 | A1 * | 10/2010 | Shimazu | C04B 33/02 165/185 |
| 2011/0011803 | A1 * | 1/2011 | Koros | B01D 53/02 210/670 |
| 2011/0048063 | A1 * | 3/2011 | Carruthers | B01J 20/20 62/476 |
| 2013/0298595 | A1 * | 11/2013 | Michel | F25B 17/08 62/476 |

FOREIGN PATENT DOCUMENTS

| | | |
|---|---|---|
| JP | 2001-139833 A | 5/2001 |
| JP | 2003-025316 A | 1/2003 |
| JP | 2007-128986 A | 5/2007 |
| JP | 2008-073569 A | 4/2008 |
| JP | 2010-530953 A | 9/2010 |
| WO | 2012/085716 A1 | 6/2012 |

OTHER PUBLICATIONS

Hirasawa, R. et al., "Development of Novel High Efficiency Adsorbants, (Ex-post) Project Evaluation Report," *Industrial Structure Council, Industrial Science and Technology Policy Committee,* Apr. 2009, http://www.meti.go.jp/policy/tech_evaluation/e00/03/h20/336.pdf (with partial translation).

Kumita, M., "Development of Densified Adsorbent for Adsorption Refrigeration," The Journal of the Heat Transfer Society of Japan, Jul. 2006, pp. 20-26, vol. 45, No. 192 (with partial translation).

Jul. 28, 2015 Office Action issued in Japanese Patent Application No. 2013-057262.

\* cited by examiner

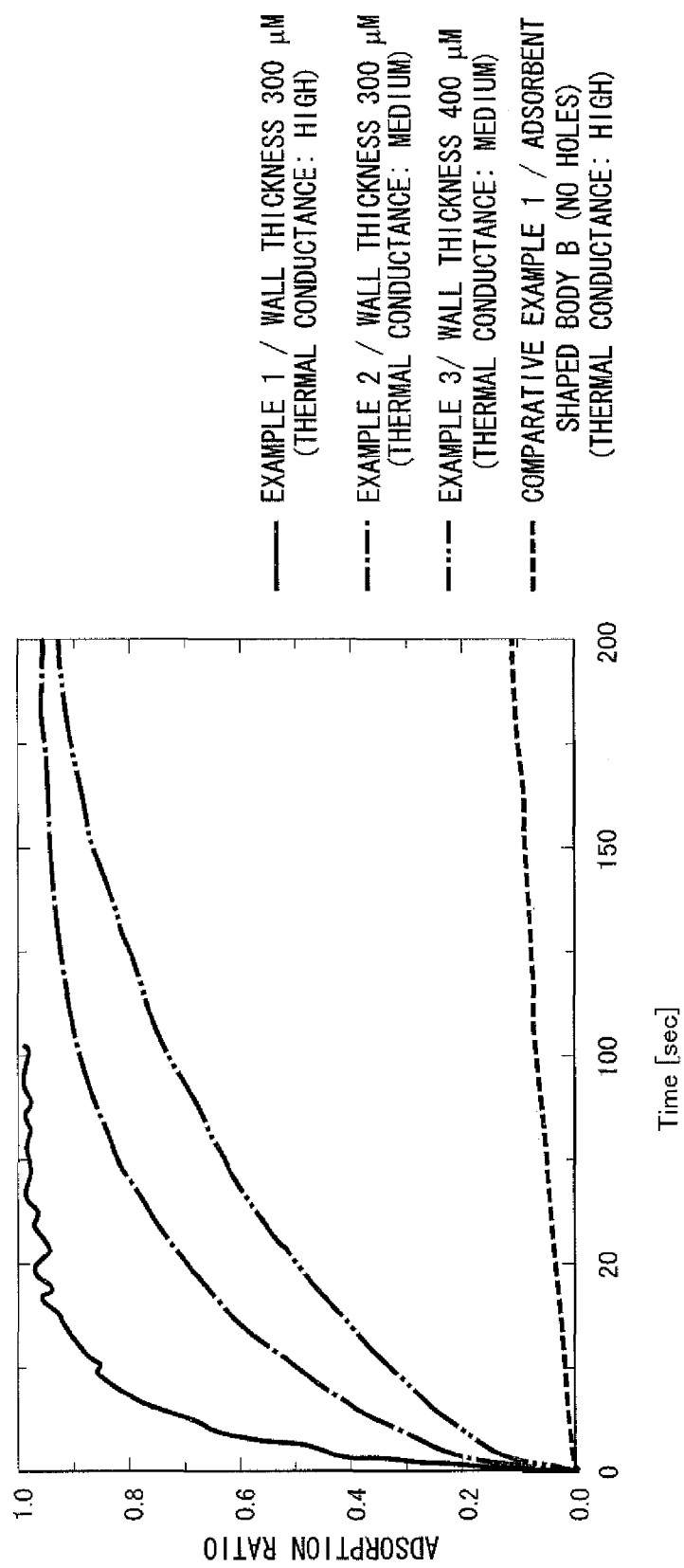

HEAT EXCHANGE REACTOR AND ADSORPTION HEAT PUMP

CROSS-REFERENCE TO RELATED APPLICATION

This application is based on and claims priority under 35 USC 119 from Japanese patent Application No. 2013-057262, filed Mar. 19, 2013, the disclosure of which is incorporated by reference herein.

TECHNICAL FIELD

The present invention relates to a heat exchange reactor and an adsorption heat pump.

BACKGROUND ART

A heat transfer system such as an adsorption heat pump includes an adsorbent, and employs a heat exchange reactor that utilizes an adsorption/desorption reaction of an adsorbate (such as water or ammonia) to the adsorbent.

Mass transport within the adsorbent is given by $(\partial c/\partial t)=\Delta D\Delta C-(1-\epsilon)\rho(\partial q/\partial t)$, and it is hypothesized that diffusion constant D therein is rate limiting for mass transport of water vapor through adsorbent layers in a case in which conventional filling constructions are adopted. Regarding this point, in practice, general adsorbent heat pumps tend to operate with an adsorption rate that is extremely slow (300 seconds to 600 seconds) compared to the intrinsic adsorption rate of the adsorbent of several seconds to several tens of seconds. Output by volume is therefore extremely small.

To improve the low output that occurs due to the limitation on the rate imposed by diffusion as described above, coated adsorption heat pumps have been proposed in which a surface of the heat exchange reactor is coated with adsorbent (see, for example, Hirasawa Ryou et. al., "Development of Novel High Efficiency Adsorbents, (Ex-post) Project Evaluation Report", (online), April 2009, Industrial Structure Council, Industrial Science and Technology Policy Committee, Evaluation Subcommittee, Internet (URL: http://www.meti.go.jp/poliey/tech_evaluation/e00/03/h20/336.pdf)). Such a heat pump has the following characteristics, and cooling output by volume in the adsorption heat pump is enhanced by these characteristics.
(1) Particle diameter is as small as several μm, and single particle adsorption rates are therefore high.
(2) Intra-layer vapor transport resistance is high, and the vapor transport resistance is therefore lowered by using a coating thickness of approximately 200 μm.
(3) The coating thickness is approximately 200 μm, and heat transfer resistance is therefore low.

SUMMARY OF INVENTION

However, although the above-described coated adsorption heat pumps are designed to resolve diffusion rate limiting, they have limitations on coating thickness. The limitations on coating thickness gives rise to the issue that a significant output enhancement cannot be expected due to the reduced adsorbent amount per unit volume. Moreover, in the coated adsorption heat pumps, since the direction of heat conduction from the heat transfer face of the heat exchange reactor and the direction of diffusion are the same, it is difficult to increase the adsorption amount per unit volume without tackling the relationships between heat conduction with distance and diffusion with distance, and without negatively impacting the adsorption/desorption rate.

The invention is arrived at based on the following finding. Namely, we found that thermal conductance between the adsorbent and a heat exchange fluid is important in a heat exchange reactor, and that, for example, in a case in which heat is conveyed from the heat exchange fluid to an adsorbent shaped body, it is possible to independently optimize the heat conduction distance and the diffusion distance by a configuration in which the direction of heat conduction from a heat transfer face of the adsorbent shaped body undergoing heat exchange with the heat exchange fluid into the interior of the adsorbent shaped body and a heat diffusion direction (flow direction of the heat exchange fluid) intersect one another.

In order to utilize the benefit of the above finding, a heat exchange reactor according to a first aspect of the invention includes:

a first flow path through which a heat exchange fluid flows;

a second flow path through which a working fluid flows; and an adsorbent shaped body disposed in the second flow path, the adsorbent shaped body having a heat transfer face at which heat is exchanged with the heat exchange fluid flowing in the first flow path, and plural recessed portions arrayed in two dimensions at specific spacings along directions in which the working fluid flows (namely directions on a flow face on which the working fluid flows) such that the working fluid flows into the plural recessed portions, the adsorbent shaped body including an adsorbent and a fibrous thermally conductive material, the adsorbent releasing heat when the working fluid is adsorbed and accumulating heat when the working fluid is desorbed, and the fibrous thermally conductive material being disposed such that an axial direction thereof is oriented in a direction that intersects with the heat transfer face.

For example, water vapor does not generally easily permeate into particle-to-particle gaps; therefore, in an adsorption/desorption system that uses water as a working fluid, it is the diffusion of the water vapor through the adsorbent that is rate limiting, and there is a tendency for the adsorption/desorption reaction in the adsorbent to become slow. A need accordingly arises to lessen the thickness of the adsorbent that exchanges heat with the heat exchange fluid during adsorption/desorption of the adsorbate, and the amount of adsorbent per unit volume inevitably decreases. To resolve this situation, it is desirable for the adsorbent shaped body to be configured with a construction that easily promotes water vapor adsorption/desorption reactions, and for heat exchange with the heat exchange fluid to proceed efficiently, as heat is being generated/absorbed during the adsorption/desorption reaction. In consideration of these points, in the first aspect, the adsorbent shaped body has a heat transfer face at which heat is exchanged with the heat exchange fluid flowing in the first flow path, and includes, at the working fluid flow face, the recessed portions arrayed in two dimensions at specific spacings (preferably a uniform spacing) along directions in which the working fluid flows, and includes a fibrous thermally conductive material disposed with its axial direction oriented in a direction that intersects with the heat transfer face of the adsorbent shaped body. This configuration achieves a state in which the working fluid has diffused through the adsorbent by flowing into the recessed portions, with the adsorption/desorption reactions of the working fluid with the adsorbent proceeding efficiently, and the absorbed or released heat arising from these reactions propagating through the fibrous thermally conductive material that serves a bridging role between the heat transfer face and the adsorbent. As a result, diffusion of the working fluid in the adsorbent occurs efficiently, and, at the same time, thermal transfer performance between the adsorbent and the heat exchange fluid also becomes efficient, leading to enhanced adsorption reaction rate and desorption reaction rate of the working fluid. As a result, the adsorption/desorption rates of the adsorbate can be maximized while increasing the adsorbent amount per unit volume.

In the first aspect, reference to the recessed portions being arrayed with "a uniform" spacing refers not only to cases in which the spacing is perfectly equal, but also includes substantially uniform arrayed states that appear uniform at a glance, despite there actually being some degree of variation between spacings.

In the first aspect, the adsorbent that configures the adsorbent shaped body preferably has a particle form, and the particulate adsorbent (adsorbent particles) preferably has an average primary particle diameter in a range of 10 μm or less.

A high density of the adsorbent is desirable to improve output; however, at the same time, the average primary particle diameter of the adsorbent particles configuring the adsorbent also becomes smaller. For small particle diameters with an average primary particle diameter of 10 μm or less, the reaction rate becomes faster during adsorption/desorption. Any increase achieved in the diffusivity of the working fluid in the adsorbent shaped body is therefore meaningful. Namely, the effect, due to configuring the adsorbent shaped body in a state in which the recessed portions are arrayed at the flow faces of the working fluid with specific spacings in two dimensions (preferably a uniform spacing), and including the fibrous thermally conductive material with its axial direction intersecting with the heat transfer face of the adsorbent shaped body, is more efficiently exhibited when the average primary particle diameter is 10 μm or less.

A thickness of the adsorbent shaped body in a recessed portion depth direction is preferably 500 μm or greater. The thermal conductance of the adsorbent shaped body and the diffusivity of the working fluid in the adsorbent shaped body are highly dependent on the thickness of the adsorbent shaped body, and since the thermal conductance and diffusivity readily decrease as the thickness of the adsorbent shaped body increases, the effects of the invention are more strongly exhibited with a thickness of 500 μm or greater. Moreover, since the thickness of the adsorbent is related to output, a greater thickness of the adsorbent shaped body is more preferred.

The shortest distance between one recessed portion and another recessed portion in the adsorbent shaped body, namely the thickness of the adsorbent between recessed portions (hereinafter also referred to as the "wall thickness" of the adsorbent shaped body), is preferably in a range of from 50 μm to 500 μm.

Generally, porous shaped bodies often have a ratio of solid to overall volume of about 20% to 30%. However, in the invention, it is desirable that the ratio of the volume of the adsorbent to the overall volume of the shaped body be higher, from the perspective of increasing output. A wall thickness of 50 μm or more in the invention indicates a low volume ratio of holes, hollows or the like present in the adsorbent shaped body, a wide spacing between holes (or between hollows), and a large volume ratio of the adsorbent. Moreover, a wall thickness upper limit of 500 μm indicates that the inter-hole or inter-hollow spacing is within a range that is not too wide, so that the ratio of the holes or the hollows at the flow faces on which the working fluid flows is not made too small and the diffusivity and adsorption/desorption reactivity of the working fluid can be maintained to some extent.

From the above perspective, a volume ratio of the recessed portions in the adsorbent shaped body with respect to the total adsorbent shaped body volume is preferably within a range of 5% or greater, but less than 20%. When the ratio of the recessed portions are at the above ratio, namely when the adsorbent is present at a high ratio of 80% by volume or higher with respect to the overall shaped body volume, the high ratio is preferred from the point of securing output; however the diffusivity of the working fluid decreases and the rate of adsorption/desorption reaction readily slows. Accordingly, a large effect is achieved due to configuring the adsorbent shaped body in a state in which the recessed portions are arrayed at the flow faces of the working fluid with specific spacings in two dimensions (preferably a uniform spacing), and including the fibrous thermally conductive material with its axial direction intersecting with the heat transfer face of the adsorbent shaped body.

Water is preferably employed as the working fluid that undergoes an adsorption/desorption reaction with the adsorbent shaped body. Water can flow and diffuse as water vapor; however, water does not readily permeate gaps between particles. There is accordingly a large effect obtained by employing an adsorbent shaped body structure with recessed portions when water is used as the working fluid.

The recessed portions present in the adsorbent shaped body may have a cross-sectional shape, taken orthogonal to the recessed portion depth direction (the direction of the thickness of the adsorbent shaped body), such that the diameter of an inscribed circle of the cross-sectional shape or the major axis of an inscribed ellipse of the cross-sectional shape is from 10 μm to 300 μm. It is preferred for each recessed portion to be smaller than the distance (wall thickness) between recessed portions from the points of view of raising the adsorbent volume ratio, and of disposing plural recessed portions at specific spacings. With a cross-sectional diameter within the above range, excellent diffusivity of the working fluid can be achieved, and thus an excellent rate of adsorption/desorption reaction can be obtained, while maintaining a large adsorbent amount (volume).

The cross-sectional shape of the recessed portions in the adsorbent shaped body taken orthogonal to the recessed portion depth direction (the direction of the thickness of the adsorbent shaped body) may be a circle or a polygon shape. Forming a circular or polygonal cross-sectional shape results in more uniform spacing of the recessed portions arrayed at specific spacings in two dimensions.

For similar reasons to those above, the cross-sectional shape is preferably a perfect circle or regular polygon, and is more preferably a square or a regular hexagon.

The thermally conductive material preferably has an axial direction that forms an angle of 45° or greater with the heat transfer face of the adsorbent shaped body. The heat exchange efficiency between the inside of the adsorbent shaped body and the heating medium is thereby further enhanced, further enhancing the reaction rate.

In the first aspect, it is preferable that out of the fibrous thermally conductive material contained in the adsorbent shaped body, the axial directions of 80% by number or more of fibers of the thermally conductive material form an angle of 70° or greater with respect to the heat transfer face.

Note that "the axial directions of 80% by number or more of fibers of the thermally conductive material form an angle of 70° or greater with respect to the heat transfer face" means that the axial directions of the majority (80% by number or more) of the fibers of the fibrous thermally conductive material contained in the adsorbent shaped body are aligned to a relatively high degree such that the axial directions are substantially orthogonal (70° or greater) to the heat transfer face.

The heat exchange efficiency between the heat exchange fluid and the inside of the adsorbent shaped body is accordingly further enhanced, thereby further raising the reaction rate of the adsorption/desorption reaction.

Moreover, compared to cases in which the axial direction of the thermally conductive material is random, spring back can be suppressed during manufacture of the adsorbent shaped body and thereby the density of the adsorbent in the adsorbent shaped body can be further raised. Spring back refers to the phenomenon whereby the volume of an adsorbent shaped body that has been temporarily reduced due to applying pressure during shaping of the adsorbent shaped body, returns when the pressure is released.

The aspect ratio of the thermally conductive material of the first aspect may be 10 or greater. The heat exchange efficiency between the heat exchange fluid and the inside of the adsorbent shaped body can accordingly be further raised, thereby enabling the rate of the adsorption/desorption reaction to be further raised.

The thermally conductive material of the first aspect is preferably an inorganic material, of which carbon fiber is preferable. The heat exchange efficiency between the heat exchange fluid and the inside of the adsorbent shaped body can accordingly be further raised, and the rate of adsorption/desorption reaction can be further raised.

The adsorbent of the first aspect is preferably at least one adsorbent selected from the group consisting of activated carbon, mesoporous silica, zeolite, silica gel, and a clay mineral.

An adsorption heat pump of a second aspect is provided with the heat exchange reactor of the first aspect.

In the second aspect, a configuration provided with a heat exchange reactor with high adsorption/desorption reaction rates of the adsorbate in the adsorbent shaped body is employed, thereby enabling heat loss to be suppressed when the reaction rate falls, giving excellent heat usage efficiency as a result.

The present invention accordingly provides a heat exchange reactor with favorable thermal conductance of a heat storage shaped body, and with raised adsorption/desorption rates of an adsorbate to an adsorbent shaped body, and an adsorption heat pump provided with the heat exchange reactor.

BRIEF DESCRIPTION OF DRAWINGS

FIG. 12 is a graph illustrating water vapor adsorption reaction rates (relationships between reaction time and adsorption ratio).

EMBODIMENTS FOR CARRYING OUT THE INVENTION

Figure 1:
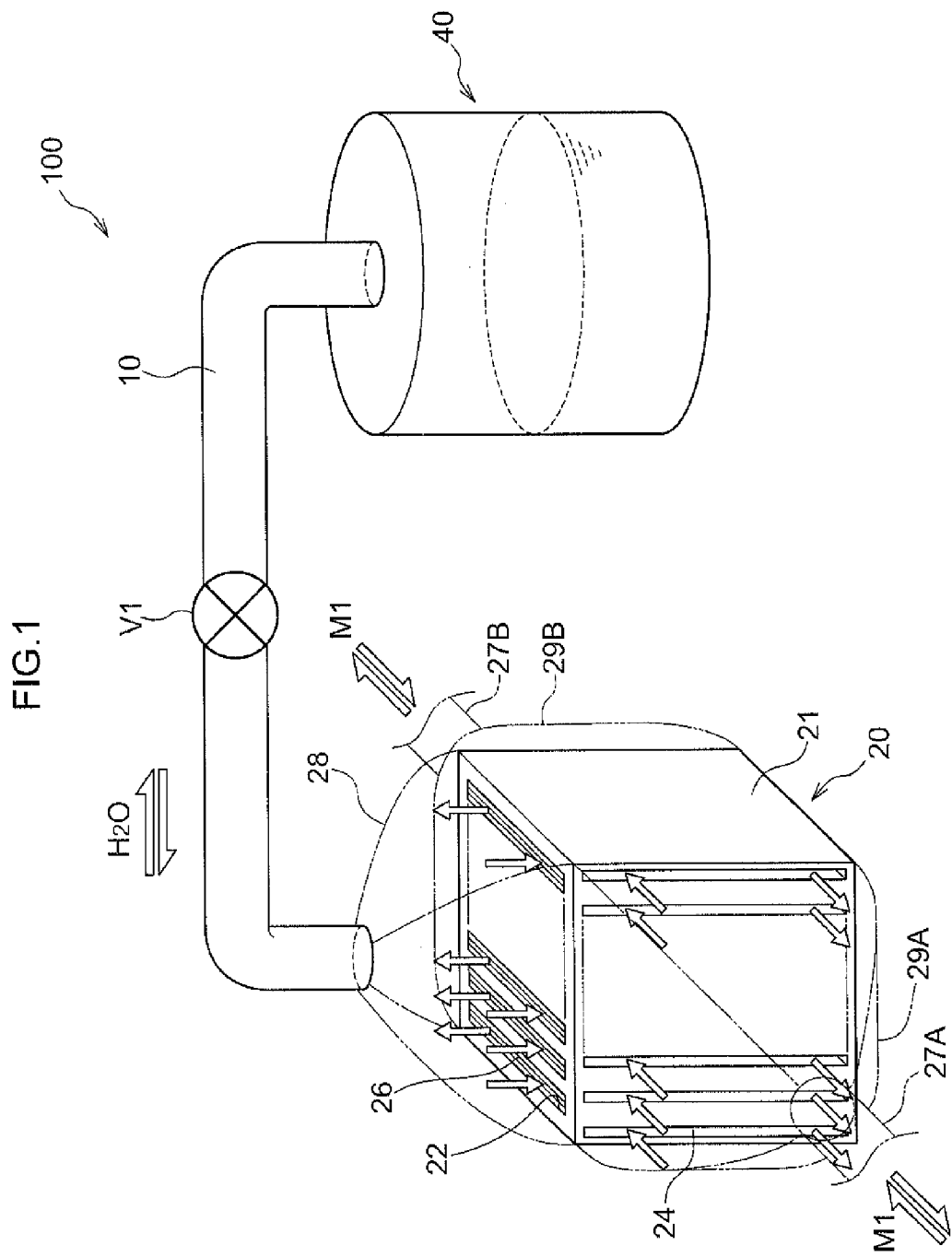
FIG. 1 is a schematic view illustrating an example of a configuration of an adsorption heat pump of a first embodiment of the invention.

Specific description is given below with reference to the drawings regarding embodiments of an adsorption heat pump provided with a heat exchange reactor. However, the present invention is not limited to the embodiments described below. Throughout the drawings, the same elements are designated by the same reference character, and overlapping explanation thereof is omitted, as necessary.

First Embodiment

A first embodiment of the adsorption heat pump of the present invention will be described with reference to FIG. 1 to FIG. 6. In the present embodiment, an example of an adsorption heat pump (hereinafter also referred to simply as "heat pump") is described below in which a zeolite serves as an adsorbent of the adsorption unit, water (liquid phase) serves as a heat exchange fluid supplied to the adsorption unit, and water vapor (water) serves as a working fluid (an adsorbate).

The meaning of water vapor includes water in a gaseous state, and water as fine condensed water droplets in the air.

As illustrated in FIG. 1, a heat pump 100 of the present embodiment is provided with a heat exchange reactor 20, an evaporative condenser 40, and a communication pipe 10 that is connected to the heat exchange reactor 20 and the evaporative condenser 40.

Provision of such a configuration enables water vapor to be adsorbed by an adsorbent shaped body within the heat exchange reactor 20 when water vapor flows from the evaporative condenser 40 to the heat exchange reactor 20, and conversely enables water vapor to be recovered in the evaporative condenser 40 when water vapor desorbed (detached) from the adsorbent shaped body within the heat exchange reactor 20 flows from the heat exchange reactor 20 to the evaporative condenser 40. The adsorption heat pump 100 operates by repeated adsorption and desorption of water vapor in the heat exchange reactor 20 and the evaporative condenser 40 in accordance with the pressure difference between the heat exchange reactor 20 and the evaporative condenser 40.

Note that for a detailed description of the operating principles of adsorption heat pumps reference can be made, for example, to pages 20 to 21 of "The Journal of the Heat Transfer Society of Japan Vol. 45, No. 192" (Shadan Houjin Nihon Dennetsu Gakkai, July 2006).

In the present embodiment, description is focused on an example in which water vapor, not easily permeating between the particles of the adsorbent shaped body and more effectively exerting an adsorption/desorption rate enhancement effect, is used as a working fluid. However, the working fluid is not limited to water vapor; ammonia, a lower alcohol (for example, an alcohols having from 1 to 6 carbon atom) or the like may be used as the adsorbate in place of the water vapor.

Figure 2:
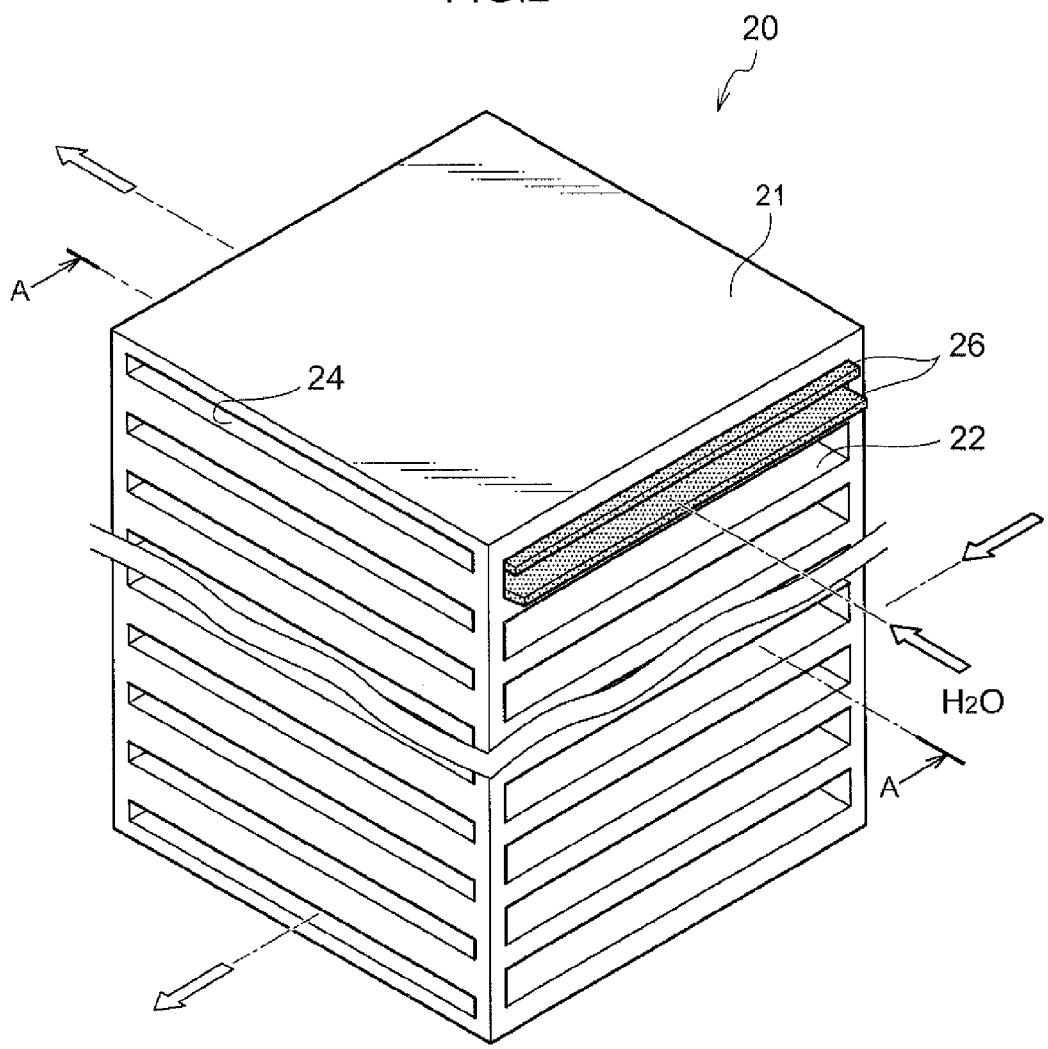
FIG. 2 is a schematic perspective view illustrating a configuration of a heat exchange reactor of the first embodiment of the invention.

FIG. 2 schematically illustrates the heat exchange reactor 20 of FIG. 1.

As illustrated in FIG. 2, the heat exchange reactor 20 is configured by: a housing body 21; plural heating medium flow paths 24 that are provided in the housing body 21 and serve as first flow paths through which a heat exchange fluid flows; plural reaction chambers 22 that are provided in the housing body 21 and configure second flow paths disposed between the heating medium flow paths; and adsorbent shaped bodies 26 that are disposed inside each reaction chamber.

To enable heat exchange between the adsorbent shaped body and the heat exchange fluid, a material with high thermal conductance that is resistant to corrosion by the adsorbate (for example, water vapor or ammonia) is highly suitable for the housing body 21. Specifically, the housing body is suitably configured by, for example, a material such as a metal (examples thereof including stainless steel, aluminum, and aluminum alloys) or a resin.

The heating medium flow paths 24 that are the first flow paths, and the reaction chambers 22 that form the second flow paths are disposed alternately to each other in the housing body 21. The reaction chambers 22 and the heating medium flow paths 24 are separated by housing body walls, and although there is no transport of material between the reaction chambers and the heating medium flow paths, mutual thermal connection is made therebetween through the walls. Namely, the adsorbent shaped body and the heat exchange fluid exchange heat according to a change in heat exchange fluid temperature or a temperature change due to heat release/absorption in the reaction chambers 22. Specifically, when a heating medium M1 is supplied from outside as illustrated in FIG. 1, heat passes between the heating medium M1 and the adjacent reaction chambers such that heat exchange is performed with the adsorbent shaped body inside the reaction chambers.

In the present embodiment, the reaction chambers 22 and the heating medium flow paths 24 are configured by angular pillar shaped spaces each having flat rectangular shaped end openings.

The reaction chambers 22 connect to one end of the communication pipe 10 and are in communication with the evaporative condenser 40 through the communication pipe 10. The reaction chambers and the evaporative condenser are in communication through the communication pipe 10, and the released water vapor is thereby sent to the evaporative condenser 40, and condensed and stored in a case in which the reaction chambers 22 release water vapor and accumulate heat. Conversely, the water vapor to be adsorbed by the adsorbent is sent from the evaporative condenser 40 to the reaction chambers 22 in a case in which the reaction chambers 22 adsorb water vapor and release heat. The effective heat utilization is thus enabled by employing the exchange of water vapor.

Figure 3:
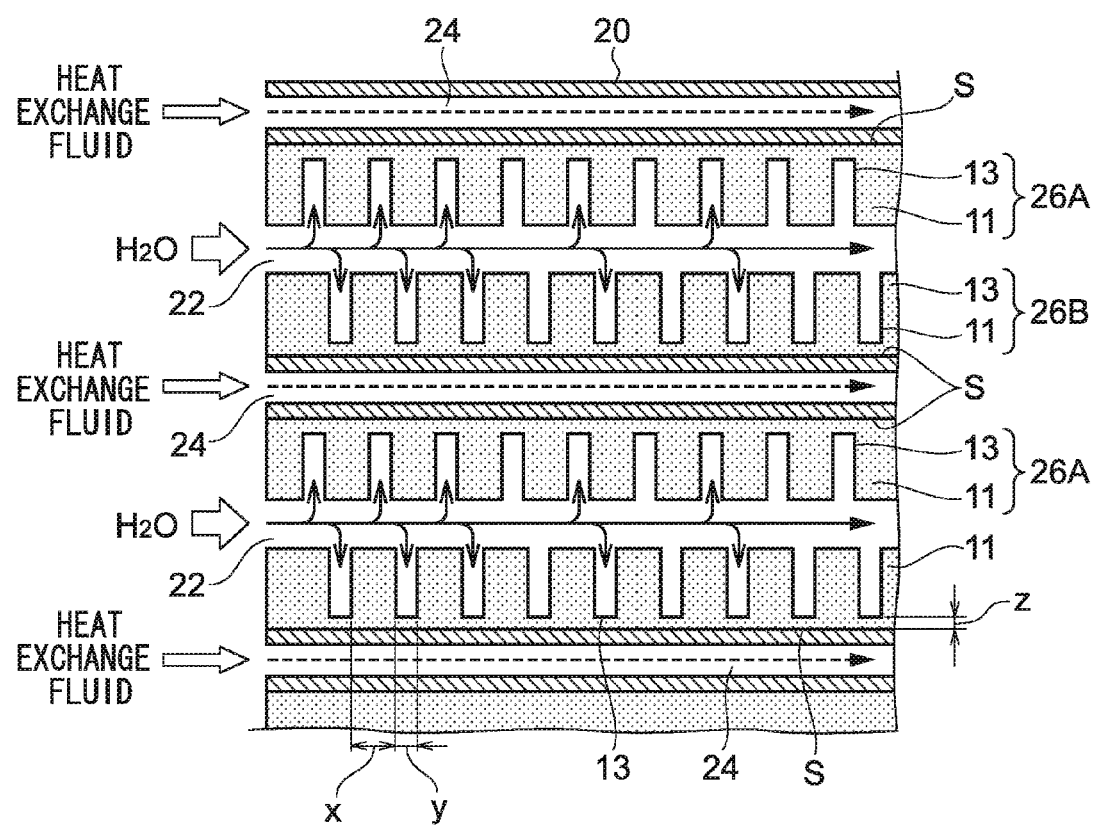
FIG. 3 is a cross-sectional view taken along line A-A in FIG. 2.

In the reaction chambers 22, the plate shaped adsorbent shaped bodies 26 are respectively attached to a top face and a bottom face of each chamber, as illustrated in FIG. 2 and FIG. 3, to enable supplied water vapor to be adsorbed and retained. Detailed description follows regarding the adsorbent.

The top face and the bottom face in each of the reaction chambers are two inner wall faces that are orthogonal to the alternating direction of the reaction chambers and the heating medium flow paths (namely, an inner wall face in each of the reaction chambers adjacent to one of the heating medium flow paths 24 and the opposing face thereto).

Figure 4:
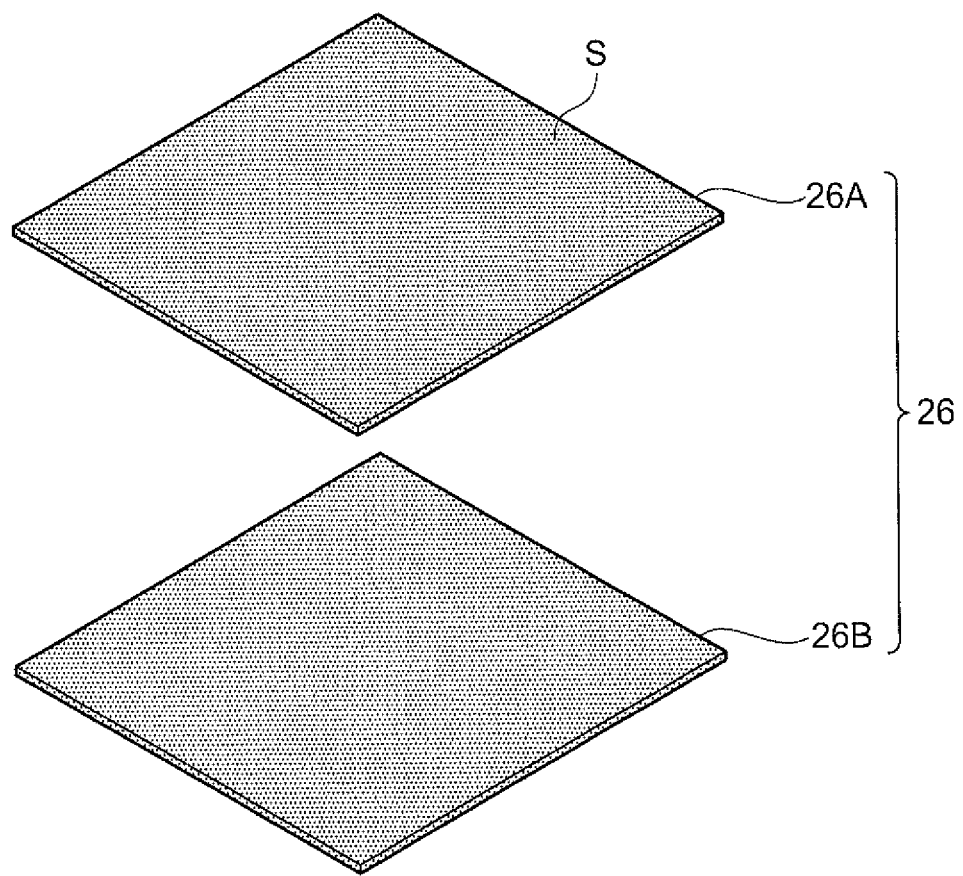
FIG. 4 is a perspective view illustrating an example of a plate shaped adsorbent shaped body housed inside a reaction chamber of a heat exchange reactor of the first embodiment of the invention.

The adsorbent shaped body 26 is formed in a plate shape using a zeolite (a physical adsorbent), an adsorbent 11 that releases heat when adsorbing water vapor (the adsorbate) and that accumulates heat when desorbing (detaching) water vapor. As illustrated in FIG. 4 the adsorbent shaped body 26 is configured by zeolite plates 26A, 26B. The zeolite plates 26A, 26B include the zeolite, and also a fibrous thermally conductive material disposed such that its axial direction intersects with a heat transfer face.

In the present embodiment, faces S of the zeolite plates 26A, 26B that face toward heating medium flow paths 24, namely, the faces (the faces S in FIG. 3) in contact with the top face and the bottom face of each chamber, are heat transfer faces, enabling heat exchange through these faces with mutually neighboring chambers.

For example, heat is exchanged through the heat transfer faces S of the zeolite plates 26A, 26B when a heated heating medium is supplied into the heating medium flow paths 24; due to the heating of the zeolite plates 26A, 26B (adsorbents), water vapor adsorbed by the zeolites is desorbed, enabling water vapor in an amount corresponding to the quantity of heat supplied during heating to be sent to the evaporative condenser 40.

Use of the adsorbent enables the heat quantity needed for adsorption (immobilization) and desorption of the water vapor to be suppressed to a small amount, facilitating the adsorption/desorption of water vapor even with a low energy.

Figure 5:
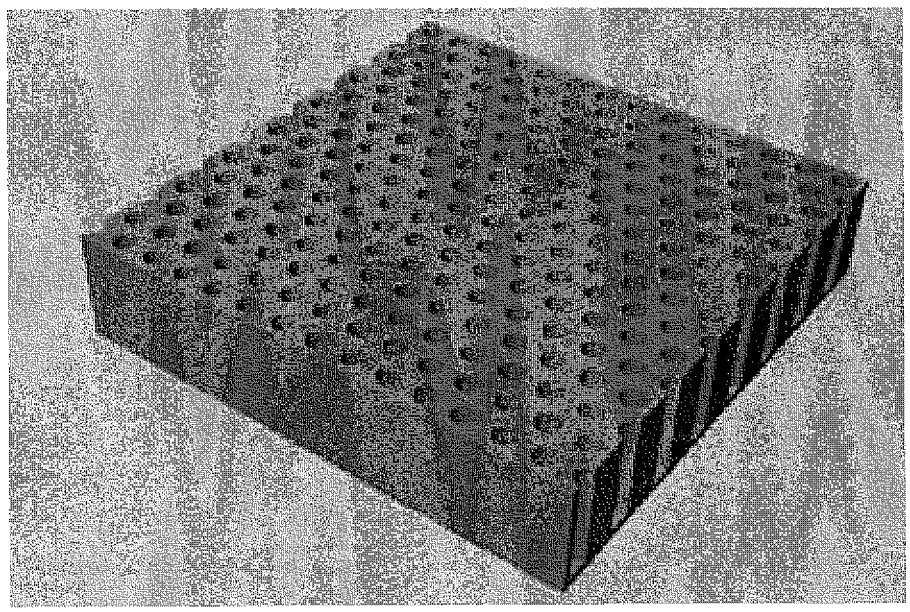
FIG. 5 is a perspective view illustrating an example of a specific structure of an adsorbent shaped body of the first embodiment of the invention.

Each of the zeolite plates 26A, 26B, each being the adsorbent shaped body of the present embodiment, has hollows with circular cross-sectional shapes arrayed at specific spacings in two dimensions, as illustrated in FIG. 5. Further description is given regarding the zeolite plates with reference to FIG. 3. FIG. 3 is a cross-section viewed along line A-A in FIG. 2.

As illustrated in FIG. 3, the zeolite plates 26A, 26B (the adsorbent shaped bodies) are respectively attached at the top face and bottom face of each reaction chamber disposed so as to be interposed between the heating medium flow paths 24 installed to the housing body, in a configuration that enables the water vapor (the working fluid) to flow between the two adsorbent shaped bodies. Namely, in the present embodiment, a flow path through which water vapor flows is fog used by one face each of the top and bottom face-attached zeolite plates 26A, 26B that form new top and bottom faces, and by the surfaces of the two side walls of the housing body that are not the top or the bottom face.

The zeolite plates 26A, 26B are each provided with the same configuration, and plural hollows 13 are arrayed in two dimensions at each face (flow face) forming the flow channel through which water vapor flows. In the present embodiment, circular cylindrical shaped hollows with circular cross-sectional shapes are provided as illustrated in FIG. 5. These hollows do not penetrate through to surface (back face) on the opposite side of the zeolite plate to the flow face side, and form recessed portions that are closed off as illustrated in FIG. 3, leaving an adsorbent thickness z at the back face.

The water vapor introduced from the one end of the reaction chambers 22 that is connected to the communication pipe 10, while moving inside the chamber toward the other end, as illustrated in FIG. 2 and FIG. 3, also permeates inside the hollows 13 that are present in the top faces and the bottom faces at intermediate locations along the respective flow channels. Due to the permeation, the diffusivity of water vapor in the adsorbent shaped body can be enhanced, and, consequently, the rate of adsorption/desorption reaction across a wide region can be increased.

Figure 6:
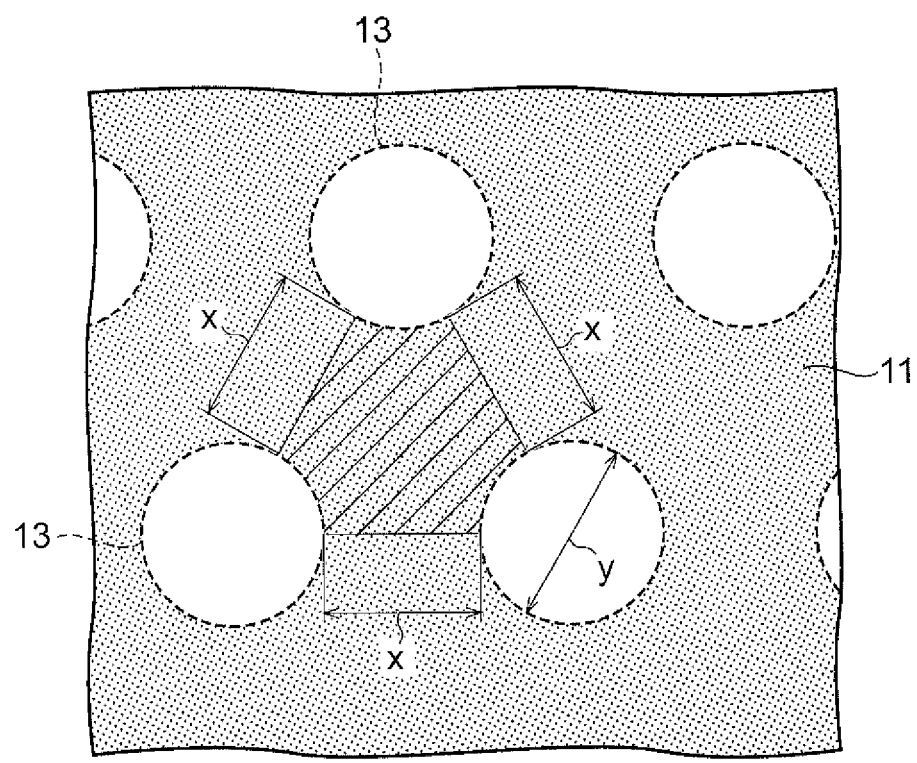
FIG. 6 is a schematic explanation diagram more specifically illustrating an array of hollows (or holes) on a flow face of the adsorbent shaped body of FIG. 5.

As illustrated in FIG. 6, the hollows 13 are formed such that the thickness of the adsorbent that separates the hollows (also referred to as "wall thickness" in the present specification) on the flow faces is x (in the present embodiment x=300 μm). A thicker wall thickness x is preferable from the point of view of raising the water vapor adsorption/desorption capacity of the adsorbent, and the shortest separation between the hollows is more preferably from 50 μm to 500 μm, and further preferably from 50 μm to 300 μm.

A wall thickness of 50 μm or greater suppresses the volume ratio of the hollows (or holes) present in the adsorbent shaped body to a low value, and has the advantage of ensuring a wide spacing between neighboring hollows (or holes) while maintaining a large adsorbent volume ratio. Moreover, a wall thickness of 500 μm or lower enables a certain level of diffusivity and adsorption/desorption reactivity of the working fluid to be maintained without making too small the volume ratio of the hollows (or holes) in the flow faces through which the working fluid such as water vapor flows.

Moreover, the hollows 13 are formed to have a cross-sectional diameter of y (in the present embodiment y=300 μm), as illustrated in FIG. 6. A cross-sectional diameter of from 10 μm to 300 μm is preferable. It is preferable for the cross-sectional diameter of the hollows to be comparatively small relative to the wall thickness x from the point of view of providing plural hollows while maintaining a high adsorbent volume ratio. A cross-sectional diameter within the above range enables excellent diffusivity of the working fluid such as water vapor, and thus excellent adsorption/desorption reaction rates, while maintaining a large adsorbent amount (volume). From out of these considerations, and for similar reasoning, a cross-sectional diameter of from 50 μm to 300 μm is more preferable, and a cross-sectional diameter of from 50 μm to 100 μm is still more preferable.

In the present embodiment, an example is described in which the hollows 13 having a circular cross-section are provided to serve as the recessed portions provided to the adsorbent; however, the recessed portions are not limited to hollows, holes, or the like with circular cross-sectional shapes. As recessed portions formed in the adsorbent shaped body, the cross-sectional shapes of the recessed portions orthogonal to the depth direction of the recessed portions may be a circle or any other shape, such as an ellipse or a polygon. Of these, from the point of view of more uniform spacing of the recessed portions that are arrayed at specific spacing in two dimensions, recessed portions with circular or polygonal cross-section shapes are preferable. Of these, the cross-sectional shapes are preferably a perfect circle or a regular polygon, and more preferably a square or a regular hexagon.

Herein, in cases in which the cross-sectional shape of the recessed portion has a shape other than a perfect circle, such as an ellipse or a polygon, the cross-sectional diameter is a diameter indicated by the diameter of a circle inscribed in the cross-sectional shape (inscribed circle) or the major axis of an ellipse inscribed in the cross-sectional shape (inscribed ellipse).

In the present embodiment, hollows that do not pass through to the faces opposite the flow faces are provided as the recessed portions provided to the adsorbent shaped body; however, the recessed portions may be formed by holes that pass through to the faces opposite the flow faces. Moreover, the recessed portions may include hollows that do not pass through to the faces opposite the flow faces, as well as holes that pass through to the faces opposite the flow faces.

According to the present embodiment, hollows that do not pass through to the faces opposite the flow faces are provided, and the volume ratio of the adsorbent is therefore large compared to cases in which holes that pass through from the flow faces to the faces opposite the flow faces are provided, and the working fluid adsorption/desorption capacity is therefore further enhanced, the configuration adopted in the present embodiment is advantageous to enhancing output.

The volume ratio of recessed portions such as hollows and holes is preferably a ratio of 5% or greater, but less than 20%, with respect to the adsorbent shaped body. By configuring with recessed portions at the above ratio, namely by configuring with the adsorbent present at a high volume ratio occupying 80% or above of the total volume of the adsorbent shaped body, a large effect is obtained by the adsorbent shaped body configured to include the recessed portions arranged on the working fluid flow faces at specific spacings (preferably a uniform spacing) in two dimensions, and to include the fibrous thermally conductive material oriented with its axial direction intersecting the heat transfer face of the adsorbent shaped body. In the present embodiment, the ratio of hollows may be 22% by volume with respect to the total volume of each of the zeolite plates.

In the heat exchange reactor 20, the heating medium flow paths 24 are connected to external heating medium supply equipment, not illustrated in the drawings, and configuration is made such that heating medium at the desired temperature is supplied to the heating medium flow paths 24, as necessary.

The heat exchange reactor 20 is configured as a direct flow heat exchange reactor in which an opening direction of the reaction chambers 22, namely the direction in which the water vapor flows, and an opening direction of the heating medium flow paths 24, namely the direction in which the heating medium flows, are orthogonal to each other.

In the heat exchange reactor, there is no particular limitation on the number of the reaction chambers 22 and the heating medium flow paths 24 provided, and this number may be set as appropriate in consideration of the quantity of heat input/output by the heat exchange reactor, the surface area of the heat transfer faces of the adsorbent shaped body, and the like.

Next, detailed description will be given with regards to components included in the adsorbent shaped body.

The adsorbent shaped body includes at least the adsorbent that releases heat when the working fluid is adsorbed and accumulating heat when the working fluid is desorbed, and the fibrous thermally conductive material with its axial direction intersecting with the heat transfer face of the shaped body, and may further include other components such as a binder as required.

Adsorbent

A porous body, such as the zeolite used in the present embodiment, may be used as the adsorbent. As such a porous body, a porous body that has pores with pore diameters of 10 nm or less is preferable from the point of view of further enhancing the reactivity in terms of immobilization by adsorption (preferably physical adsorption) of the fluid, such as water vapor, and desorption of the fluid. A minimum pore diameter of 0.5 nm is preferable from the point of view of manufacturability and the like. Also from the point of view of manufacturability and the like, a porous body that is a primary particle aggregation body obtained by aggregation of primary particles with an average primary particle diameter of 50 µm or less is preferable as the porous body. A lower limit to the average primary particle diameter of 1 µm is preferable from the point of view of manufacturability and the like.

Examples of adsorbents other than the zeolite used in the present embodiment include activated carbon, mesoporous silica, silica gel, and clay minerals. The clay mineral may be a clay mineral with no cross-links or a clay mineral with cross-links (cross-linked clay mineral). Examples of clay minerals include sepiolites, smectite clays (such as saponites, montmorillonite, or hectorites), tetrasilicic mica, mica, and vermiculite, and of these, sepiolites are preferable.

As the zeolite, a zeolite having a specific surface area of from 50 $m^2/g$ to 1000 $m^2/g$ as determined by the BET method is preferable (from 100 $m^2/g$ to 1000 $m^2/g$ is more preferable).

As the silica gel, a silica gel having a specific surface area of from 100 $m^2/g$ to 1500 $m^2/g$ as determined by the BET method is preferable (from 300 $m^2/g$ to 1000 $m^2/g$ is more preferable).

As the activated carbon, an activated carbon having a specific surface area of from 800 $m^2/g$ to 4000 $m^2/g$ as determined by the BET method is preferable (from 1000 $m^2/g$ to 2000 $m^2/g$ is more preferable).

As the mesoporous silica, a mesoporous silica having a specific surface area of from 500 $m^2/g$ to 1500 $m^2/g$ as determined by the BET method is preferable (from 700 $m^2/g$ to 1300 $m^2/g$ is more preferable).

It is preferable that the adsorbent be included as particles, and it is preferable that the average particle diameter of the particles is an average primary particle diameter of 10 µm or less. The reaction rate becomes fast during adsorption or desorption when the adsorbent particles have small particle diameters with an average primary particle diameter of 10 µm or less. An increase in the diffusivity of the working fluid in the adsorbent shaped body is therefore highly meaningful in cases in which the average primary particle diameter is 10 µm or less. A greater effect is accordingly exhibited in the configuration of the invention, or more specifically a configuration including the recessed portions arrayed with specific spacings in two dimensions (preferably a uniform spacing) and including the fibrous thermally conductive material with axial direction that intersects with the heat transfer face of the adsorbent shaped body, by making the average primary particle diameter 10 µm or less. Within this configuration, an adsorbent average primary particle diameter of from 1 µm to 10 µm is more preferable.

In the invention, the type of the adsorbent (preferably a porous body) may be appropriately selected as desired. It is preferable that the adsorbent includes at least zeolite or silica gel, or both, from the view point of further enhancing the reactivity in terms of immobilization of water by adsorption and desorption of the water. Moreover, it is preferable that the adsorbent includes at least activated carbon, from the view point of further enhancing the reactivity in term of immobilization of ammonia by adsorption, and desorption of the ammonia.

From the view point of maintaining a higher reactivity in terms of immobilization of fluid and desorption thereof, the content ratio the adsorbent to the total volume of the adsorbent shaped body is preferably in a range of 70% by volume or higher, more preferably in a range of 80% by volume or higher, and still more preferably in a range of 90% by volume or higher.

Binder

Binder may be included with the adsorbent in cases in which the adsorbent is used as a shaped body. Including a binder facilitates maintaining the shape of the shaped body, and thereby further enhances the reactivity in terms of immobilization of the heating medium by adsorption, and desorption thereof. A water-soluble binder is preferable as the binder. Examples of water-soluble binders include polyvinyl alcohol, and trimethyl cellulose. Moreover, in addition to the adsorbent and the binder, other components may be included as required. Examples of other components include heat conducting inorganic materials such as carbon fibers and metal fibers.

In a case in which shaping is performed using the adsorbent and a binder, from the view point of more effectively maintaining the shape of the shaped body, the ratio of binder included with respect to the total volume of the adsorbent shaped body is preferably a 5% or higher by volume, and more preferably a 10% by volume or higher. Furthermore, the ratio of binder included with respect to the total volume of the adsorbent shaped body is preferably 20% by volume or lower, and more preferably 10% by volume or lower.

The shaping method is not particularly limited, and examples of shaping methods include a method including shaping the adsorbent (and other components such as binder as required) using a known formation means such as pressure shaping or extrusion. The pressure during shaping may be set to be, for example, from 20 MPa to 100 MPa and is preferably set to be from 20 MPa to 40 MPa.

The filling density of the adsorbent in the adsorbent shaped body is preferably from 0.10 g/mL to 0.80 g/mL. A filling density of 0.10 g/mL or higher enables an increase in the quantity of adsorbate involved in the adsorption/desorption reaction. When the filling density is 0.80 g/mL or less, the transport resistance of the adsorbate through the adsorbent shaped body can further be decreased.

The thickness (namely, the thickness in the recessed portion depth direction) of the zeolite plates 26A, 26B, which are adsorbent shaped bodies, is preferably 500 µm or greater. The thermal conductance of the adsorbent shaped body and the working fluid diffusivity in the adsorbent shaped body are highly dependent on the thickness of the adsorbent shaped body, and the thermal conductance and diffusivity readily decrease as the thickness of the adsorbent shaped body increases. Therefore the effect achieved by the invention is greater when the thickness of the adsorbent shaped body is 500 µm or greater. Moreover, due to the adsorbent thickness being related to output and conversion efficiency, and especially related to Coefficient Of Performance (COP), a greater thickness of the adsorbent shaped body is more preferred. A more preferable thickness of the adsorbent shaped body is 1000 µm or greater. The upper limit to the thickness of the adsorbent shaped body is determined by thermal conductivity. A thickness of the adsorbent shaped body of 3000 μm or less is preferable as too great a thickness causes a decrease in output. However, there is no such limitation in a case in which the thermal conductivity exceeds 10 W/m·K.

Thermally Conductive Material

The adsorbent shaped body includes at least one fibrous thermally conductive material with its axial direction intersecting with the heat transfer face of the adsorbent shaped body.

The adsorbent included in the adsorbent shaped body generally has a low thermal conductivity (thermal conductivities of general adsorbents are, for example, within the range of from 0.05 W/m·K to 0.25 W/m·K), and therefore in an adsorbent shaped body that includes an adsorbent, there are cases in which the adsorbent temperature is changed by the heat of adsorption and the heat of desorption due to an adsorption/desorption reaction, causing a change in the equilibrium relationship and thereby hindering a subsequent adsorption/desorption reaction.

In relation to this point, including the fibrous thermally conductive material in the adsorbent shaped body, such that the axial direction of the fibrous thermally conductive material intersects with the heat transfer face of the adsorbent shaped body, results in heat exchange being performed efficiently between the interior of the adsorbent shaped body and the heating medium (the heating medium M1 in the present embodiment) through the thermally conductive material. Due to heat exchange being performed in this manner, adsorption heat is dissipated with high efficiency from the interior of the adsorbent shaped body to the heat exchange fluid during adsorption, and desorption (detachment) heat is supplied with high efficiency from the heat exchange fluid to the interior of the adsorbent shaped body during desorption (detachment).

A problem of progress of the adsorption/desorption reaction being hindered by adsorption heat and desorption heat is thereby lessened, and reaction rates of the adsorbate adsorption/desorption reactions in the adsorbent shaped body are raised.

From the point of view of exhibiting the above effect more effectively, the aspect ratio of the fibrous thermally conductive material (fiber length/fiber width) is preferably 10 or greater, and more preferably 15 or greater. Moreover, from the point of view of maintaining a higher adsorbent filling density, the aspect ratio is preferably 500 or less, more preferably 300 or less, and particularly preferably 100 or less.

The fiber length of the fibrous thermally conductive material is not particularly limited. The fiber length is preferably from 10 μm to 1000 μm, more preferably from 10 μm to 500 μm, and particularly preferably from 100 μm to 300 μm.

The fiber width of the fibrous thermally conductive material is not particularly limited. The fiber width is preferably from 0.01 μm to 100 μm, more preferably from 0.1 μm to 100 μm, and particularly preferably from 1 μm to 50 μm.

From the point of view of increasing thermal conductance and making the adsorption/desorption reaction proceed at a more efficient rate, the fibrous thermally conductive material is preferably an inorganic material, and more preferably at least one material chosen from the group consisting of metal fibers and carbon fibers (also referred to as "CF" below).

Examples of the metal fibers include aluminum fibers and copper fibers.

Of the above, the fibrous thermally conductive material is particularly preferably a carbon fiber.

Moreover, the carbon fiber is preferably a carbon fiber having a length of from 10 μm to 500 μm (more preferably from 100 μm to 300 μm) at an aspect ratio of from 10 to 500.

The thermal conductivity in the axial direction of the fibrous thermally conductive material is not particularly limited as long as the thermal conductivity is higher than the thermal conductivity of the adsorbent. The thermal conductivity in the axial direction of the fibrous thermally conductive material may be set to be, for example, 1.0 W/m·K or higher, and more preferably 2.0 W/m·K or higher.

In the adsorbent shaped body, there is no particular restriction to the direction of the axis of the thermally conductive material other than that the axial direction intersects with the heat transfer face of the adsorbent shaped body, and a configuration may be employed in which the axial directions of plural fibers of the thermally conductive material are random directions with respect to the heat transfer face.

However, from the point of view of further enhancing the heat exchange efficiency, and further enhancing the adsorption/desorption reaction rate, the adsorbent shaped body preferably includes, as the fibrous thermally conductive material, at least a fibrous thermally conductive material of which the axial direction forms an angle of 45° or greater with the heat transfer face. An adsorbent shaped body with this configuration may further include fibrous thermally conductive material of which the axial direction forms an angle of less than 45° with the heat transfer face (such as, for example, cases in which the axial directions of the fibers of the fibrous thermally conductive material are random directions with respect to the heat transfer face).

The meaning herein of a fibrous thermally conductive material of which the axial direction forms an angle of 45° or greater with the heat transfer face, is that the smallest angle out of the angles formed between the axial direction and the heat transfer face is 45° or greater (a fibrous thermally conductive material of which the axial direction forms an angle of 70° or greater and a fibrous thermally conductive material of which the axial direction forms an angle of 80° or greater" in the following are defined in the same manner except for the difference of the angle value).

In the invention, it is particularly preferable that the axial directions of a majority of the fibers of the fibrous thermally conductive material included in the adsorbent shaped body are made uniform to a certain extent and are substantially orthogonal to the heat transfer face, from the point of views of further enhancing the heat exchange efficiency and further enhancing the adsorption/desorption reaction rate. More specifically, it is preferable that 80% by number or more (preferably 90% by number or more, and more preferably 95% by number or more) of the fibers of the fibrous thermally conductive material included in the adsorbent shaped body are distributed with their axial directions forming an angle of 70° or greater (more preferably 80° or greater) with the heat transfer face.

Moreover, in the configurations described above, springback can be suppressed, compared to cases in which the axial directions of the fibers of the thermally conductive material are random, during manufacture of the adsorbent shaped body; therefore, the density of the adsorbent in the adsorbent shaped body can be further enhanced, and the reaction rate can be further enhanced.

Note that although the angle between the axial direction and the heat transfer face is ideally 90° (orthogonal), in consideration of the effect on the heat exchange efficiency, cases in which the angle is 90° need not only include perfectly orthogonal cases, but also include substantially orthogonal cases that appear to be 90° (orthogonal) at a glance.

The volume of thermally conductive material in the adsorbent shaped body with respect to the total volume of the adsorbent shaped body is preferably from 1% to 30% by volume, more preferably from 1% to 20% by volume, and particularly preferably from 5% to 20% by volume. The effects of the thermally conductive material are easily obtained when the volume of the thermally conductive material included is 1% by volume or greater, and a greater quantity of adsorbate is involved in the adsorption/desorption reaction when the volume of the thermally conductive material included is 30% or lower.

Method of Producing Adsorbent Shaped Body

The adsorbent shaped body can be produced (formed) using hitherto known methods, and the method is not particularly limited. Examples of methods of producing the adsorbent shaped body include a method including preparing a mixture (for example, a slurry) that includes the adsorbent and the fibrous thermally conductive material, and shaping the mixture by a known formation method such as pressure shaping or extrusion.

In cases in which pressure shaping is performed, the pressure during shaping may be set to be, for example, from 20 MPa to 100 MPa, and the pressure during shaping is preferably in a range of from 20 MPa to 40 MPa.

Forming of the recessed portions may be performed by, for example, performing shaping into a plate shape and then forming recessed portions in the desired shape in the shaped body, or may be performed by forming recessed portions at the same time as shaping.

Moreover, in cases in which recessed portions are formed after shaping, hollows or holes, serving as recessed portions, may be formed by cutting out adsorbent mechanically using milling cutter or the like at desired positions in the shaped body.

Examples of methods of producing an adsorbent shaped body in which the axial directions of 80% by number or more of the fibers of the fibrous thermally conductive material included in the adsorbent shaped body form an angle of 70° or greater with the heat transfer face of the shaped body, include the first method and second method described below.

The first method and the second method utilize the property that during formation of the adsorbent shaped body by extrusion, the axial direction of the fibrous thermally conductive material readily aligns substantially parallel to the extrusion direction.

Herein, "the axial direction of the fibrous thermally conductive material substantially parallel to the extrusion direction" indicates that the angle formed between the axial direction of the thermally conductive material and the extrusion direction is 30° or less (preferably 20° or less).

The first method includes: firstly producing a shaped body having a pillar shape by extrusion, the axial directions of the fibers of the thermally conductive material being aligned in directions substantially parallel to the extrusion direction during extrusion; and subsequently cutting the obtained pillar-shaped body along plural flat planes that are orthogonal to the extrusion direction during extrusion, thereby obtaining the adsorbent shaped body as a flat-plate-shaped body.

The second method includes: firstly producing plural flat-plate-shaped bodies by extrusion, the axial directions of the fibers of the thermally conductive material being aligned in directions substantially parallel to the extrusion direction during extrusion; superimposing the obtained plural flat-plate-shaped bodies on each other and bonding the plural flat-plate-shaped bodies, to obtain a pillar-shaped body; and cutting he obtained pillar-shaped body along plural flat planes orthogonal to the extrusion direction during extrusion, thereby obtaining the adsorbent shaped body as a flat-plate-shaped body.

In the adsorbent heat pump 100, as illustrated in FIG. 1, the heat exchange reactor 20 and the communication pipe 10 are connected through a header member 28 (for example, a manifold) that hermetically connects the plural reaction chambers 22 within the heat exchange reactor 20 and the communication pipe 10 and allows communication between the plural reaction chambers 22 and the communication pipe 10. Connecting through the header member 28 enables the flow of water vapor between the plural reaction chambers 22 and the communication pipe 10 while ensuring an airtight state.

The heat exchange reactor 20 and a heating medium pipe 27A are connected through a header member 29A (for example, a manifold). Moreover, the heat exchange reactor 20 and a heating medium pipe 27B are connected through a header member 29B (for example, a manifold).

The header member 29A allows the plural heating medium flow paths 24 in the heat exchange reactor 20 to communicate with the heating medium pipe 27A while maintaining the airtight state, and the header member 29B allows the plural heating medium flow paths 24 to communicate with the heating medium pipe 27B while maintaining the airtight state.

Such communication through the heating medium pipe 27A and the heating medium pipe 27B enables the heating medium M1 to flow between the heating medium flow paths 24 in the heat exchange reactor 20 and the adsorption heat pump 100 exterior (the target of heat utilization).

Note that in FIG. 1 the header member 28, the header members 29A, 29B, and the heating medium pipes 27A, 27B are illustrated with double-dot intermittent lines to make the configuration of the heat exchange reactor 20 easier to see.

The heating medium M1 is a heat exchange fluid that performs heat exchange with the adsorbent shaped body, and an alcohol such as ethanol, water, an oil, a mixture thereof, or the like, or a fluid commonly used as a heating medium may be used as appropriate.

A valve V1 is provided to the communication pipe 10 that allows the heat exchange reactor 20 and the evaporative condenser 40 of the adsorption heat pump 100 to communicate with each other, as illustrated in FIG. 1. By using the valve V1 to allow or prohibit the communication between the heat exchange reactor 20 and the evaporative condenser 40, the difference in the pressure of water vapor between the heat exchange reactor 20 side and the evaporative condenser 40 side as viewed from the valve V1 can be adjusted. This adjustment enables the difference between the pressure of water vapor at the heat exchange reactor 20 side and the pressure of water vapor at the evaporative condenser 40 side to be maintained within a suitable range. Namely, maintaining a closed state of valve V1 enables the difference in water vapor pressure to be maintained for a long period of time, and subsequently opening the valve V1 enables water vapor to be transferred from one side to the other side.

In the present embodiment, the configuration of the evaporative condenser 40 is not particularly limited, and known configurations of evaporative condensers may be applied. Moreover, an evaporator and a condenser may be used in place of the evaporative condenser 40 in the present embodiment.

Moreover, at least one of an exhaust member to exhaust from inside the equipment, a pressure measurement instrument to measure water vapor pressure or ammonia pressure within the equipment, or the like may further be connected to the adsorption heat pump 100.

In the first embodiment, explanation has been given of an example in which water vapor serves as the working fluid; however, the working fluid is not limited to water vapor, and similar effects can be obtained by using a fluid, other than water vapor, that has a comparatively high latent heat of vaporization, such as ammonia.

Second Embodiment

Description is given below regarding an adsorption heat pump of a second embodiment of the invention, with reference to FIG. 7.

The present embodiment is configured by an adsorbent shaped body in which holes 53 are arrayed in place of the adsorbent shaped body of the first embodiment in which the hollows 13 are arrayed.

Note that the same reference numerals are assigned to the same configuration components as those of the first embodiment, and detailed description thereof is omitted.

Figure 7:
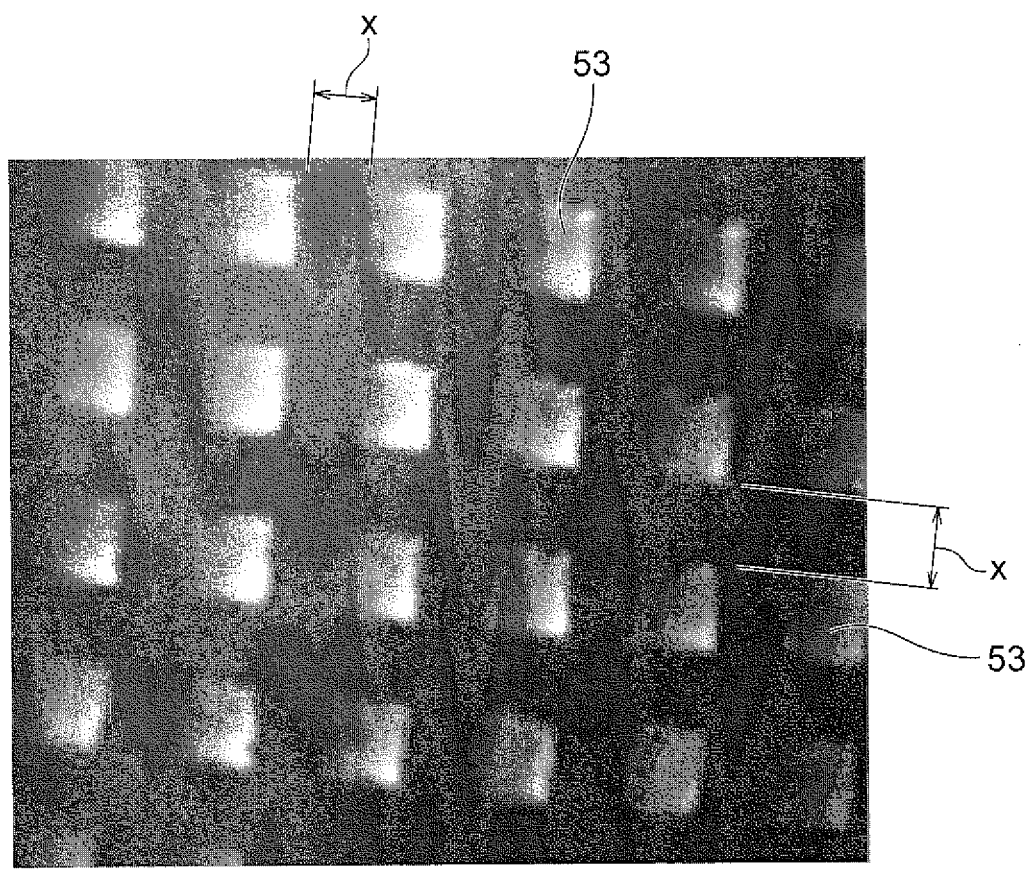
FIG. 7 is an enlarged view illustrating recessed portions of an adsorbent shaped body of a second embodiment of the invention.

As illustrated in FIG. 7, the adsorption heat pump of the present embodiment is provided with a heat exchange reactor in which zeolite plates are disposed in the reaction chambers 22, and each zeolite plate has plural holes 53 with square cross-sectional shapes that are arrayed in two dimensions at the flow face, the flow faces of the zeolite plates forming flow paths through which the water vapor flows.

In the present embodiment, the holes 53 have a cross-sectional diameter (a length of one side) y of 300 μm, a wall thickness x of adsorbent between holes of 300 μm, and a hole depth of 1500 μm. The thickness of the adsorbent shaped body of the present embodiment is 1500 μm.

Since the shape of the holes 53 that are arrayed in two dimensions on the water vapor flow face of the adsorbent shaped body has a square cross-section, the inter-hole spacing of the holes arrayed at specific spacings becomes more uniform.

Third Embodiment

Description is given below regarding an adsorption heat pump of a third embodiment of the invention, with reference to FIG. 8.

The present embodiment is configured with a laminated body of superimposed zeolite plates in place of the two zeolite plates (the adsorbent shaped bodies) installed respectively to the top face and the bottom face of each of the reaction chambers in the first embodiment.

Note that the same reference numerals are assigned to the same configuration components as those of the first embodiment, and detailed description thereof is omitted.

Figure 8:
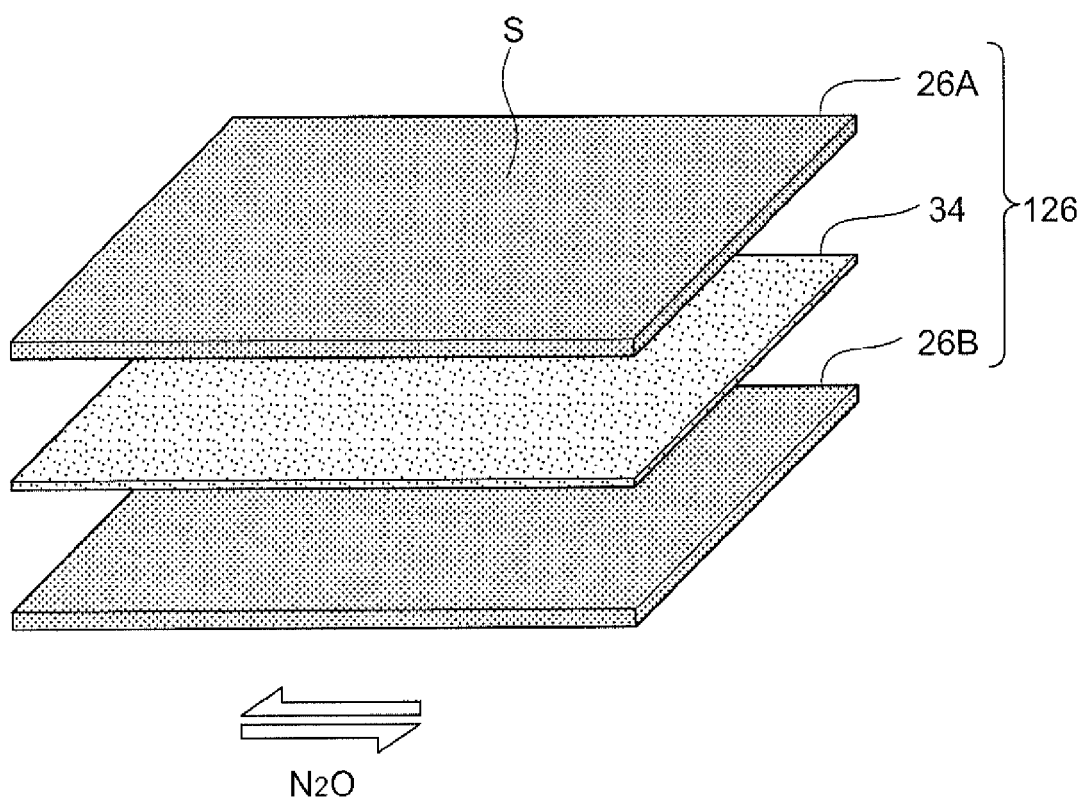
FIG. 8 is a perspective view illustrating an example of an adsorbent shaped body of a third embodiment of the invention.

The reaction chambers 22 of the heat exchange reactor 20 of the present embodiment are, as illustrated in FIG. 8, provided with a laminated body 126 that is configured by two adsorbent shaped bodies (an adsorbent shaped body 26A and an adsorbent shaped body 26B) and a supporting substrate 34 interposed between these two adsorbent shaped bodies.

The supporting substrate 34 has the function of making the water vapor (the adsorbate) flow in a direction running along a face of the supporting substrate (the direction indicated by the white arrows in FIG. 8), and to allow the diffusion and supply of water vapor to the adsorbent shaped bodies disposed at both sides of the supporting substrate. Provision of the supporting substrate surely provides a flow path for water vapor between the two adsorbent shaped bodies and thereby enables the water vapor supplied from the communication pipe 10 to be supplied to wide regions spanning the adsorbent shaped bodies 26A and 26B. Moreover, provision of the supporting substrate also enables the water vapor that has been adsorbed over wide ranges spanning the adsorbent shaped bodies 26A and 26B to be released through the supporting substrate 34 toward the communication pipe 10.

A porous plate or sheet (of stainless steel or the like) may, for example, be employed as the supporting substrate.

The configuration of the laminated body may be a configuration with a three layer construction of adsorbent shaped body/supporting substrate/adsorbent shaped body, and other than a three layer construction, may also be a configuration of alternately disposed adsorbent shaped bodies and supporting substrates in which the outer most layers are adsorbent shaped bodies (for example, an adsorbent shaped body/supporting substrate/adsorbent shaped body/supporting substrate/ . . . and so on . . . /adsorbent shaped body multi-layered construction (for example a 5 layer construction)).

EXAMPLES

More specific description of the invention are given below with reference to examples. However, the invention is not limited to the examples below provided that the spirit of the invention is not exceeded.

Examples 1 to 3

1. Production of Adsorbent Shaped Body a

A slurry was obtained by mixing together: from 60 to 80 parts by mass of powdered zeolite (having an average primary particle diameter of 3 μm, and a specific surface area of 1000 $m^2/g$ as determined by the BET method) as the adsorbent; 20 parts by mass of sepiolite (a clay mineral) as the binder; from 20 to 40 parts by mass carbon fiber (CF) (a milled product (XN-100 manufactured by Nippon Graphite Fiber Corporation) having a fiber length of 200 μm, a fiber width of 10 μm and an aspect ratio of 20) as the fibrous thermally conductive material; and 100 parts by mass water.

The obtained slurry was extrusion-molded at an extrusion pressure of 40 MPa using a mold having an opening portion of 20 mm×3 mm, and 7 flat-plate-shaped bodies of 20 mm×20 mm size×3 mm thickness were produced.

Next, the 7 flat-plate-shaped bodies were bonded together using adhesive (carboxymethyl cellulose (CMC)) so as to be superimposed in the thickness direction, to obtain a pillar-shaped body.

The obtained pillar-shaped body was cut along plural flat planes orthogonal to the extrusion direction during the extrusion molding (a direction orthogonal to the direction in which the 7 plates were stacked), to obtain flat-plate-shaped bodies having a thickness of 3 mm were obtained. Holes that extend parallel to the direction of the thickness of the shaped body and have circular cross-sections (diameters of 300 μm) were then mechanically formed through the flat-shaped bodies by CNC machine processing in a two dimensional staggered array, as illustrated in FIG. 5 and FIG. 6. The holes were formed such that the wall thickness x became the numerical value given in Table 1 below. Moreover, in the present example plural holes were formed that pass through in the thickness direction of the shaped body by removing portions of the adsorbent shaped body along the thickness direction.

One side of the flat-plate-shaped body was then machined to adjust the size, and plate-shaped adsorbent shaped bodies a (x=300 μm), plate-shaped adsorbent shaped bodies b (x=300 μm), and plate-shaped adsorbent shaped bodies c (x=400 μm) were each produced at 20 mm×20 mm size×1.5 mm thickness. The 20 mm×20 mm faces of each of the adsorbent shaped bodies a, b and c were employed as heat transfer faces.

Each of adsorbent shaped bodies a, b, and c produced as described above has a thickness of 1.5 mm. In each of adsorbent shaped bodies a, b, and c, holes that have a perfectly circular cross-sectional shape and a cross-sectional diameter y given in Table 1 below were provided to the water vapor flow face such that the wall thickness x (shortest distance between holes) was as given in Table 1 below.

The filling density of the zeolite in each adsorbent shaped body and the ratio of zeolite contained with respect to the total amount of the adsorbent shaped body are as given in Table 1 below. Moreover, the ratio of carbon fiber (CF) contained with respect to the total amount of the adsorbent shaped body was from 20% to 40% by volume.

TABLE 1

| Adsorbent Shaped Body | Wall Thickness x (μm) | Hole Cross-sectional diameter y (μm) | Zeolite Filling Density (g/ml) | Content Ratio of Zeolite (Parts by Mass) | Content Ratio of CF (Parts by Mass) | Aperture Ratio of Shaped body (% by Volume) |
|---|---|---|---|---|---|---|
| Example 1 | a | 300 | 300 | 0.5 | 60 | 40 | 23 |
| Example 2 | b | 300 | 300 | 0.6 | 80 | 20 | 23 |
| Example 3 | c | 400 | 300 | 0.5 | 80 | 20 | 17 |
| Comparative Example 1 | d | — | — | 0.5 | 60 | 40 | 0 |

The aperture ratio in the adsorbent shaped body was 23% by volume at x=300 μm, and 17% by volume at x=400 μm, as given in Table 1.

Figure 9:
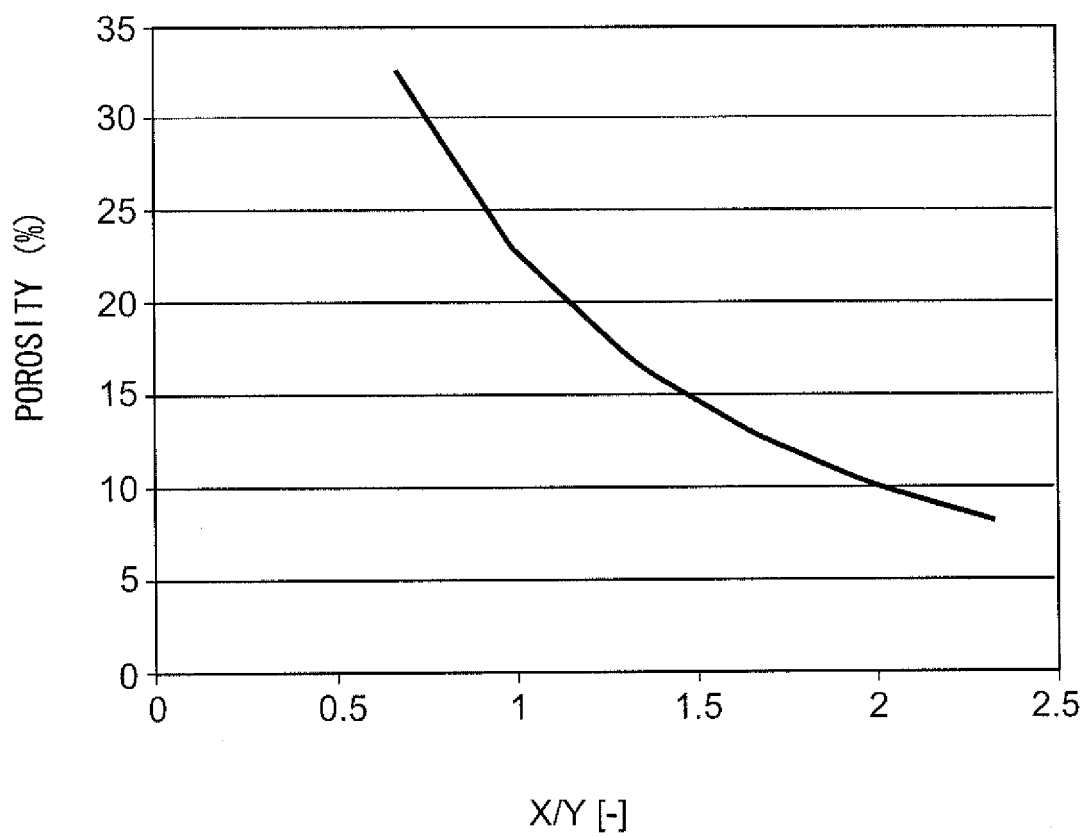
FIG. 9 is a graph illustrating a relationship between x/y and an aperture ratio (porosity).

The aperture ratio of the adsorbent shaped body can be obtained according to the equation below. The relationship between the value of x/y and the aperture ratio (the porosity) in each of the adsorbent shaped body is as illustrated in FIG. 9. As illustrated in FIG. 9, an aperture ratio ≤10% can be achieved by varying the wall thickness x and the cross-sectional diameter y of the hollows or holes.

Aperture ratio (%)=100−{density of adsorbent shaped body/density of shaped body in the absence of holes×100}

Figure 10:
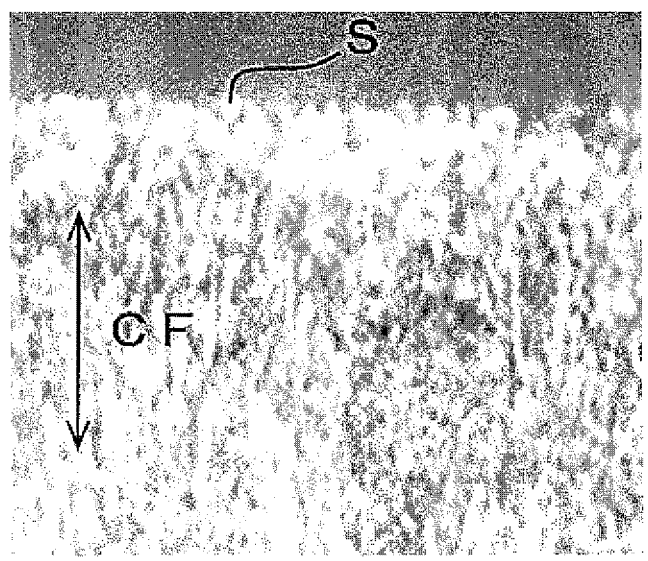
FIG. 10 is a cross-sectional photograph of an adsorbent shaped body a disposed within an adsorbent shaped body of an example according to the invention.

The obtained adsorbent shaped body was cut along the thickness direction, and the obtained cross-section was inspected by optical microscope (at a magnification ratio of 3000). FIG. 10 illustrates a photograph of a cross-section of the adsorbent shaped body inspected by optical microscope. In FIG. 10, the heat transfer face S and the CF axial direction are illustrated (the double sided arrow).

As illustrated in FIG. 10, the axial directions of a majority of the carbon fibers included in the adsorbent shaped body were aligned with directions substantially orthogonal to the heat transfer face S. To be more specific, in each of the adsorbent shaped bodies a, b, and c, 95% by number or more of the contained carbon fibers have an axial direction that forms an angle of 70° or greater with the heat transfer face.

2. Production of Heat Exchange Reactor

A heat exchange reactor configured as illustrated in FIG. 2 to FIG. 3 was produced using the adsorbent shaped bodies a, b, or c. Specifically, the production was performed as described below. Namely, a housing body 21 (made of SUS304) with two reaction chambers 22 was prepared, and the adsorbent shaped bodies a, b, or c produced as described above were respectively attached to the top faces and the bottom faces of the reaction chambers with their respective heat transfer faces in contact with the top faces and the bottom faces.

3. Adsorption Rate Measurement

Figure 11:
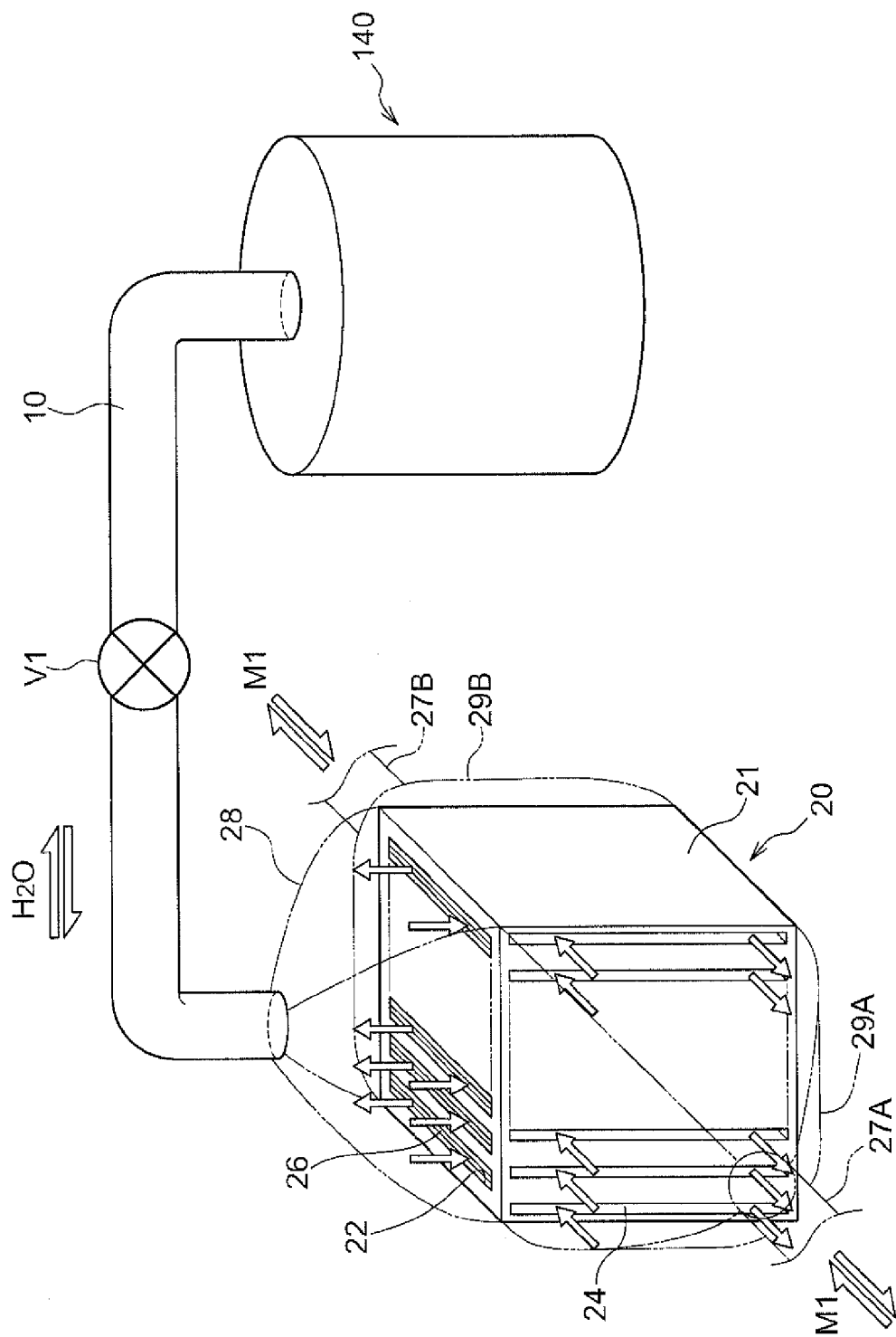
FIG. 11 is a schematic view illustrating a configuration example of an adsorption heat pump employed in an example according to the invention.

Using the heat exchange reactor produced as described above, a test device was prepared with a configuration similar to that of the adsorption heat pump illustrated in FIG. 11. In the test device, the heat exchange reactor had a capacity of 10 mL and a tank 140 had a capacity of 2500 mL.

Measurement of the water vapor adsorption rate was performed as described below.

In a preparatory step, with the valve V1 in an open state, water (the heating medium M1) at a fluid temperature of 95° C. was allowed to flow in the heating medium flow paths 24 of the heat exchange reactor 20 at a flow rate of 1000 mL/min, and water vapor that had been respectively adsorbed in the adsorbent shaped body a, b or c inside the reaction chambers 22 was desorbed (detached) and transferred to the tank 140. During this step, change in the internal pressure of the tank 140 due to the transfer of the water vapor was observed, and the valve V1 was then closed when such change became negligible.

The valve V1 was then opened in a state in which water (heating medium M1) having a fluid temperature of 30° C. was flowing at a flow rate of 1000 mL/min, and water vapor was transferred through the communication pipe 10 from the tank 140 to the adsorbent shaped body a, b, or c in the reaction chambers 22, and adsorbed (adsorption temperature: 30° C.). During this step, a pressure drop in the tank 140 due to the transfer of water vapor was observed, the reaction rate of the adsorption of water vapor (relationship between reaction time and adsorption ratio) was derived, and the adsorption rate of the water vapor measured. The time elapsed from the point in time when the valve V1 was opened was taken as the reaction time. Here, the adsorption ratio refers to a ratio of the amount adsorbed to the equilibrium adsorption amount.

The measurement results are illustrated in FIG. 12.

Comparative Example 1

A comparative adsorbent shaped body d was prepared in the same manner as in the production of the adsorbent shaped body b in Example 2, except that holes were not formed in the flat-plate-shaped body having a thickness of 3 mm. A heat exchange reactor was produced and measurements were carried out in the same manner as in Example 2, except that the adsorbent shaped body d was used in place of the adsorbent shaped body b.

The results of the measurement of the adsorption rate are illustrated in FIG. 12, together with the results obtained in Example 1 to Example 3.

As is clear from the results illustrated in FIG. 12, in Example 1 to Example 3 that have holes (recessed portions) arrayed in the flow face of the adsorbent shaped body across which water vapor flows, the adsorption/desorption rate was greatly enhanced, and the amount of adsorbed/desorbed water vapor was remarkably increased, as compared to Comparative Example 1 in which holes were not formed. Specifically, with a saturated vapor pressure of 15° C. and an adsorption temperature 30° C., the adsorption amount reached 90% of the equilibrium adsorption amount in 40 seconds in the case in which the adsorbent shaped body a was used, and in 100 seconds in the case in which the adsorbent shaped body b was used.

Moreover, as illustrated by Example 1 to Example 3, the adsorption rate tends to increase as the wall thickness of the shaped body, expressing the hole-to-hole spacing, was reduced from 400 μm to 300 μm. However, as the wall thickness becomes thinner, the aperture ratio increases, and hence maintaining the adsorbent amount and ensuring the adsorption capacity becomes more difficult. It is accordingly desirable to select the wall thickness and the adsorbent amount, in consideration of the balance between wall thickness and adsorbent amount.

In the above Examples, the reaction rate of the water vapor adsorption reaction (adsorption rate) and the adsorption ratio were evaluated; however, similar results can be obtained from the above Examples for the reaction rate of water vapor desorption (detachment rate) and the desorption ratio.

The invention claimed is:

1. A heat exchange reactor comprising:
   a first flow path through which a heat exchange fluid flows;
   a second flow path through which a working fluid flows; and
   an adsorbent shaped body that is disposed in the second flow path, the adsorbent shaped body including: (i) a heat transfer face at which heat is exchanged with the heat exchange fluid flowing in the first flow path, and (ii) a plurality of recessed portions arrayed in two dimensions at predetermined spacings along a direction in which the working fluid flows such that the working fluid flows into the plurality of recessed portions,
   the adsorbent shaped body being made of a mixture of at least an adsorbent and a fibrous thermally conductive material, the adsorbent being configured to: (i) release heat when the working fluid is adsorbed, and (ii) accumulate heat when the working fluid is desorbed, and the fibrous thermally conductive material being disposed such that an axial direction of the fibrous thermally conductive material is oriented in a direction that intersects with the heat transfer face.

2. The heat exchange reactor of claim 1, wherein the adsorbent includes a plurality of adsorbent particles having an average primary particle diameter of 10 μm or less.

3. The heat exchange reactor of claim 1, wherein a thickness of the adsorbent shaped body in a direction of a depth of the plurality of recessed portions is 500 μm or greater.

4. The heat exchange reactor of claim 1, wherein a shortest distance between each of the plurality of recessed portions in the adsorbent shaped body is from 50 μm to 500 μm.

5. The heat exchange reactor of claim 1, wherein a volume ratio of the plurality of recessed portions in the adsorbent shaped body with respect to a total volume of the adsorbent shaped body is 5% or greater but less than 20%.

6. The heat exchange reactor of claim 1, wherein the working fluid is water.

7. The heat exchange reactor of claim 1, wherein a cross-sectional diameter of each of the plurality of recessed portions in the adsorbent shaped body taken orthogonal to a direction of a depth of each of the plurality of recessed portions is from 10 μm to 300 μm in terms of an inscribed circle diameter or an inscribed ellipse major axis.

8. The heat exchange reactor of claim 1, wherein a cross-sectional shape of each of the plurality of recessed portions in the adsorbent shaped body taken orthogonal to a direction of a depth of the recessed portions is a circle or a polygon.

9. The heat exchange reactor of claim 8, wherein the cross-sectional shape is a tetragon or a hexagon.

10. The heat exchange reactor of claim 1, wherein the thermally conductive material includes a plurality of fibers having axial directions that form an angle of 45° or greater with the heat transfer face.

11. The heat exchange reactor of claim 1, wherein the thermally conductive material includes a plurality of fibers having axial directions, the axial directions of 80% by number or more of the plurality of fibers of the thermally conductive material in the adsorbent shaped body form an angle of 70° or greater with the heat transfer face.

12. The heat exchange reactor of claim 1, wherein the thermally conductive material has an aspect ratio of 10 or greater.

13. The heat exchange reactor of claim 1, wherein the thermally conductive material is an inorganic material.

14. The heat exchange reactor of claim 1, wherein the thermally conductive material is carbon fiber.

15. The heat exchange reactor of claim 1, wherein the adsorbent includes at least one adsorbent selected from a group consisting of: activated carbon, mesoporous silica, zeolite, silica gel, and a clay mineral.

16. An adsorption heat pump provided with the heat exchange reactor of claim 1.

* * * * *